United States Patent [19]
Ishihara et al.

[11] Patent Number: 5,200,976
[45] Date of Patent: Apr. 6, 1993

[54] SYNCHRONIZING SYSTEM

[75] Inventors: Yukihito Ishihara, Ohme; Yasuyuki Kozima, Hitachi; Atsushi Mizuno, Kodaira, all of Japan

[73] Assignees: Hitachi Ltd.; Hitachi Denshi Kabushiki Kaisha, both of Tokyo, Japan

[21] Appl. No.: 614,875

[22] Filed: Nov. 16, 1990

[30] Foreign Application Priority Data

Nov. 25, 1989 [JP] Japan .................................. 1-305297

[51] Int. Cl.$^5$ ............................................. H04L 7/033
[52] U.S. Cl. ......................................... 375/8; 375/120
[58] Field of Search .................... 375/106, 108, 120, 7, 375/8; 331/1 A, 14, 18, 25; 328/55, 72, 155

[56] References Cited

U.S. PATENT DOCUMENTS

| | | | |
|---|---|---|---|
| 4,369,515 | 1/1983 | Valdes | 375/108 |
| 4,590,602 | 5/1986 | Wolaver | 375/120 |
| 4,628,519 | 12/1986 | Najafi | 375/120 |

OTHER PUBLICATIONS

Kenji Inoue, et al., "Special: LSI's for Communication and the Expanding Application Fields", Japanese Technical Journal Electronics, Oct. 1984, pp. 51-55. (English translation provided).

Russell J. Apfel, et al., "A Single–Chip Frequency–Shift Keyed Modem Implemented Using Digital Signal Processing", IEEE Journal of Solid-State Circuits, vol. SC-19, No. 6, Dec. 1984, pp. 869-877.

"The Collection of Design Examples of PLL Control Circuits", published by K. K. Triceps, Dec. 18, 1987, p. 34.

*Primary Examiner*—Benedict V. Safourek
*Attorney, Agent, or Firm*—Fay, Sharpe, Beall, Fagan, Minnich & McKee

[57] ABSTRACT

In a synchronizing circuit, such as a DPLL (Digital Phase-Locked Loop), adapted to be synchronized in accordance with clock signals of an external clock, a programmable timer in the circuit is forcedly reset in synchronism with the edge of an external clock signal pulse at the time of the clock signal's initial state in accordance with a clock detection circuit. Subsequently, baud timing of the external clock signals is detected by making use of internal clock signals produced by the circuit. Synchronism is thus established and maintained between the circuit and the external device.

10 Claims, 4 Drawing Sheets

SYNCHRONIZING SYSTEM

BACKGROUND OF THE INVENTION

The present invention relates to a synchronizing system and a circuit therefor, and to a technique suitable for use in, for example, a modulator and demodulator (hereinafter called "MODEM").

The term "MODEM" is known as an acronym for modulator/demodulator that transmits data therefrom over an analog transmission line such as a telephone line. There are various kinds of communication systems or mod/demod systems. However, LSIs (Large-Scale Integration) have been promoted as semiconductor devices for realizing the MODEM.

Regarding the current circumstances of Large-Scale Integration of the MODEM, small-scale integration, i.e., LSI is indispensable to the fact that the MODEM is rendered high-performance and multi-functioned as described in Japanese Technical Journal "Electronics", p.p. 51-55, October 1984. In particular, each of high-speed MODEMs having transmission speeds of 4800 bps, 9600 bps or the like have recently been used with a digital signal processor (hereinafter called merely "DSP") to utilize a digital signal processing technique which has been created with the development of the utilization technology. Incorporated inside the DSP are a RAM (Random Access Memory) for temporarily storing data therein, a data ROM (Read-Only Memory) for storing therein constants required to perform arithmetic calculation, a high-speed parallel multiplier, an addition/subtraction and arithmetic and logic unit (ALU), an input/output port (I/O port) and an instruction ROM for writing signal processing procedures therein. In particular, the DSP is normally provided at its inside with data bus lines and two sets of RAMs to efficiently execute the calculation. Otherwise, some designs such as an address pointer for exhibiting high level functions and performing high-speed calculation, interrupt control, automatically-repeated instruction functions have been made in the DSP.

On the other hand, even when the modulation/demodulation is subjected to the digital signal processing by means of the above-described DSP, an analog circuit is required to provide an interface to be linked to lines. Even at this portion, an analog front end LSI is used. The analog front end LSI is composed principally of a transmit-receive filter for eliminating stop-band signals, an A/D (Analog/Digital) converter, and a D/A (Digital/Analog) converter. In addition to the above LSI, there is provided another LSI in which an attenuator (ATT) for setting the level of a signal or the like is incorporated.

A low-speed MODEM having the transmission speed of 1200 bps or less has been used with a FSK (frequency shift keying) or PSK (phase shift keying) modulation system. Since both systems can be realized by using circuits having simple circuit structures and are less affected by the line distortion, thereby making it unnecessary to have an automatic equalizer, one-chip type MODEM has been realized in which digital and analog units have been integrated into a single semiconductor chip. An example of such one-chip type MODEM has been described in the article "IEEE Journal of Solid State Circuits" published in U.S.A., Vol. SC-19, No. 6, pp. 869-877. The MODEM described in this article is of a low-speed MODEM in which the FSK modulation system is only incorporated, but which shows one orientation for the LSI. Namely, the MODEM has nine data modes and nineteen operation modes. The mod/demod required to perform the operations of the MODEM in these modes and all functions of filters or the like have been realized by the digital signal processing of two DSPs which are integrated together with the A/D converter and the D/A converter into one chip. Otherwise, this MODEM has a serial interface, a loop back test function and the like incorporated therein, which have been determined by the RC232C interface standard and the V.24 interface standard.

Regarding hardware, each of the two DSPs has a data RAM, a coefficient ROM, an instruction ROM. The two DSPs are activated in a separate manner, respectively. In addition, each of the A/D converter and the D/A converter serves to select the high sampling rate based on the sampling theorem developed by Nyquist. However, they can also select the higher sampling rate to eliminate turnaround noise caused by the sampling. As the A/D converter is used with a complement-type delta sigma system, wherein a sequential analog circuit is omitted and digital circuits such as decimeters, interpolators are used in combination, thereby obtaining an A/D converted signal at the desired sampling rate. Therefore, this system can bring about features that, even when the digital circuits are principally integrated into one chip, they have less variations in characteristics as semiconductor devices and good stability. As a result, the reproducibility of the characteristics is offered even if they are mass-produced, and a number of operation modes and complex functions can be realized by software control without increasing the size of the chip to that extent.

In such a conventional MODEM as being typical of the MODEM described in the above-described article, a DPLL (Digital Phase-Locked Loop) operation is used to synchronize the MODEM with a terminal device such as a microcomputer, and values counted by a programmable timer (digital VCO) are changed corresponding to the difference in clock phase between the two. This DPLL is disclosed in the technical Journal "The Collection of Design Examples of PLL Control Circuits" published by Kabushiki Kaisha Triceps., p.p. 34, issued on Dec. 18, 1987. Notwithstanding the above MODEM, a synchronous pull-in or lead-in method for a PLL circuit has been disclosed in Japanese Patent Laid-Open No. 63-286082.

The DPLL employed in the conventional MODEM or the like is designed to make a fine adjustment of the programmable timer (programmable counter) in accordance with the result of phase comparison for each baud timing, i.e., incrementing the value of a pulse by +1 or decrementing the same by −1 as in the DPLL described in the above-described article, thereby effecting the synchronization of the DPLL. Therefore, it has definitely been shown by the investigation of the present inventors that several tens of bauds or so are required to make a phase conformity, thereby causing a long lead-in time.

Here, the term "Baud" generally shows a unit of signaling speed. The signaling speed is represented by the number of unit elements per second, which constitute Morse codes.

Since the MODEM or the like has been used with a fixed oscillator circuit having the same oscillating frequency as the terminal device, the synchronization of the DPLL can be performed instantly by resetting the programmable timer of the DPLL in synchronism with the clock from the terminal device as in the synchronous lead-in method for the PLL circuit, which has been described in Japanese Patent Laid-Open No. 63-286082. However, since 1 baud is made up of a plurality of bits and a taken-in-data is made for each baud in the MODEM or the like, the baud timing signal, i.e., baud timing is formed therein continuously. Therefore, when the programmable timer is reset by an external clock which is in asynchronism with the baud timing signal, the continuity of the baud timing is broken. Thus, the above-described synchronous lead-in method for the PLL circuit cannot be utilized as it is.

The MODEM is connected to the terminal device by connectors. Therefore, there is a case where a desired clock is not supplied from the terminal device due to the imperfect contact of the connectors therebetween and their disconnection. It is thus necessary to provide functions for determining or detecting whether or not the external clock is inputted. In the conventional MODEM, the number of outputs of +1 or −1 produced plural times continuously is counted by making use of the phase comparison output of the DPLL, to thereby detect the presence or absence of the supply of the external clock. Namely, when the external clock is not supplied, the inputted clock is fixed to a low or high level Therefore, +1 or −1 continues to be outputted as the phase comparison output. This clock detection method is required to investigate whether or not the above −1 or +1 continues to be outputted over a longer period of time than the relatively long lead-in time for the DPLL. Therefore, a longer period of time should be spent to judge whether or not the clock is detected. As a result, it has definitely been shown by the investigation of the present inventors that the conventional MODEM is accompanied by the problem that a relatively long period of time is required to receive a request-to-transmit-data from the terminal device for thereby performing the input of data to be transmitted.

SUMMARY OF THE INVENTION

It is an object of the present invention to provide a synchronizing system which permits its synchronization in a short time by a simple construction and a circuit therefor.

It is another object of the present invention to provide a synchronizing system suitable for a MODEM and a circuit therefor.

The above and other objects, novel features and advantages of the present invention will become apparent from the following description and the appended claims, taken in conjunction with the accompanying drawings.

A brief description will now be, made of a typical one of the embodiments disclosed in the present application. Namely, in a DPLL circuit synchronized in accordance with each of the external clocks supplied from the outside, a programmable timer in the DPLL circuit is forcedly reset in synchronism with the edge of each external clock at the time of its initial state. In addition, the baud timing of each external clock is detected by making use of an internal clock produced by the DPLL circuit. Further, a flip-flop circuit is provided to determine the level of the external clock from the internal clock produced by the DPLL circuit. Thus, a gate means is controlled to forcedly reset the programmable timer in the DPLL circuit with the external clock at the time of its initial state. Further, the baud timing is detected from a bit pattern representative of output signals from the flip-flop circuit.

According to the above-described means, the synchronization of the DPLL can be performed momentarily by a simple construction, and its internal operation can be brought into the normal condition by detecting the baud timing.

DETAILED DESCRIPTION OF THE PREFERRED EMBODIMENTS

Figure 7:
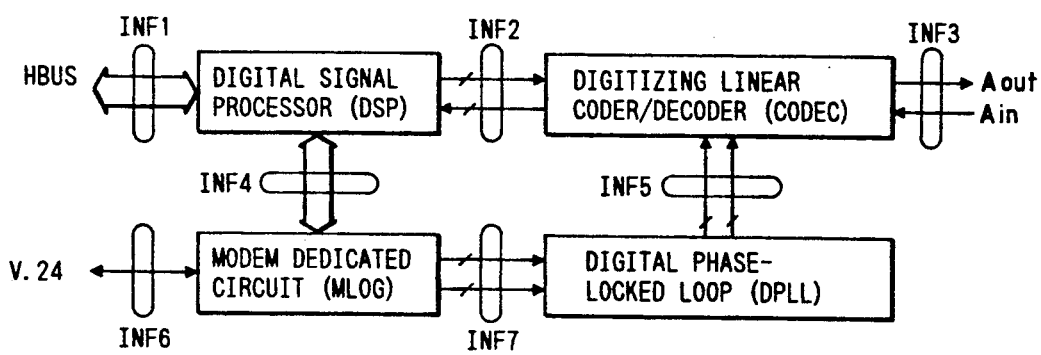
FIG. 7 is a schematic block diagram showing one embodiment of the MODEM to which this invention is applied.

FIG. 7 shows a block diagram of one embodiment illustrative of the overall construction of a hardware in a MODEM to which the present invention is applied. The overall construction shown in the same drawing is not limited in particular. However, it is formed on a single semiconductor substrate, i.e. a monocrystalline silicon, by any known manufacturing technique of a semiconductor integrated circuit.

Included as modulator/demodulator systems applicable in the MODEM employed in the present embodiment are relatively high-speed quadrature amplitude modulation systems such as a PSK (Phase Shift Keying) system of a type that the phase of a carrier is shifted according to "1" and "0" of digital data, thereby performing phase modulation and demodulation and a QAM (Quadrature Amplitude Modulation) system of a type that the amplitude of the carrier as well as the phase is also varied according to "1" and "0" of the digital data, thereby performing modulation/demodulation processing.

The MODEM employed in the present embodiment comprises a digital signal processor (hereinafter called merely "DSP"), a digitizing linear coder/decoder (hereinafter called merely "CODEC"), a MODEM dedicated circuit (hereinafter called merely "MLOG"), a digital phase-locked loop (hereinafter called merely "DPLL") and interfaces INF1 to INF7 which are provided to the DSP, the CODEC, the MLOG and DPLL, respectively. The MLOG comprises a serial interface, a sampling timer, etc. (not shown). All of the DPLL is not constructed of hardware and a part thereof is subjected to software processing as will be described later.

The DSP is provided with the interface INF1 linked to a terminal device such as a microcomputer, etc., the interface INF2 used to perform the transfer of transmission/reception data between the DSP and CODEC, and the peripheral bus INF4 adapted to perform the transfer of digital data between the DSP and MLOG.

The CODEC is provided with the interface INF5 for receiving a basic timing signal delivered from the DPLL therein and the analog interface INF3 in addition to the interface INF2 linked to the DPLL. Further, the MLOG has the serial interface INF6 linked to the above terminal device and the interface INF7 for receiving a sample timing signal supplied to the DPLL in addition to the interface INF4 linked to the DSP. The DPLL is electrically connected to the MLOG and the CODEC via the above interfaces INF7 and INF5.

Data SD (SEND DATA) from the terminal device is inputted to the MLOG at a predetermined transfer speed through the interface INF6 of the MLOG. At this time, the data is inputted thereto in plural bits/baud as will be described later. It is necessary to synchronize a transmission clock from the terminal device with a clock from the MODEM in order to input such data thereto. The data thus received is delivered to the DSP via the interface INF4. Then, the DSP subjects the transferred data to modulation processing and thereafter conveys the data thus modulation-processed to the CODEC. The CODEC causes the data to pass through a digital low-pass filter and thereafter performs D/A conversion of the data, thereby delivering an analog output signal Aout to a line via the interface INF3.

Reversely, an analog input signal Ain, received through the interface INF3, is converted into a digital signal by an A/D converter in the CODEC. The digital signal thus converted passes through a low-pass filter to thereby eliminate noise in a required stopband. Thereafter, the digital signal with noise-eliminated is delivered to the DSP via the interface INF2. Then, the DSP demodulates the thus-delivered digital signal by the digital signal processing and outputs the thus demodulating signal as data RD (RECEIVE DATA) therefrom.

Incidentally, the DPLL has a function for matching the sampling timing designated by the MLOG with the actual sampling timing of the CODEC. The interface INF1 of the DSP is used to receive a start signal, a mode signal, a parameter signal or transmission data required to perform the operation of the MODEM, from the terminal device, to send back received data and to inform the terminal device of an internal state.

The DSP comprises a host interface unit, a data memory unit, a calculation unit, a control unit and a codec interface unit, all of which are unillustrated. Their respective circuit blocks are connected to one another by means of three buses comprising a X-bus, a Y-bus and a D-bus. In addition to the above components, the DSP also has control signal lines, which are used to perform the transfer of data and to control internal functions.

The host interface unit comprises an input/output register used to perform the transfer of data to and from the terminal device, a flag register for indicating the state of the interface, a circuit used to provide access to these registers from the terminal device, and a timing generating circuit for generating a basic operation timing used for the DSP.

The data memory unit is composed principally of a RAM and a ROM, each of which is provided with an address pointer and an address selector. A RAM access selector corresponding to the X-bus and Y-bus is provided on the data bus side. Although not limited in particular, the RAM is comprised of four pages and is a memory which can read data therefrom and write the same therein. The RAM performs address designation with addresses selected by the address selector. Such addressing uses three addresses, i.e., an address to be directly designated by a soft instruction and two output addresses designated by the two address pointers. A selected address is inputted to the RAM. The four pages are accessed simultaneously on the data bus side of the RAM. However, the two sets of address selectors select one of these pages separately, respectively, and the thus-selected one page can be outputted to the Y-bus and the X-bus. Therefore, the RAM can exhibit the dual-port RAM function. The address pointer is a counter which can read the value of output data therefrom and write the same therein directly by software or indirectly by an accumulator. In addition, it can automatically update the value counted by the counter, following reference to the memory. The ROM has the same function as the RAM as well as used for read-only processing. The reading of the data from one of the selectors or the address pointer and writing of the same therein can all be designated by software as one instruction. Thus, these data memories, i.e., the RAM and ROM, can refer to the address designated serially by the instruction and also can provide various memory access by means of the address pointer, a multi-page simultaneously reading/multiinput selector, two reading buses, etc.

The calculation unit is made up of the following circuits. A parallel multiplier multiplies the data value of the Y-bus by that of the X-bus or the data value of the Y-bus by that of the D-bus every operation clocks of the DSP. The results of multiplication are stored or held in a temporary or short-term storage register provided in an output portion. An addition/subtraction logic arithmetic circuit performs calculation designated by an instruction. The addition/subtraction logic arithmetic circuit has two input portions provided with input selectors respectively. One of the input selectors supplies the data of the Y-bus or the results of multiplication to one input portion of the addition/subtraction logic arithmetic circuit. The other of the input selectors supplies the data of the X-bus or the data of the D-bus to the other input portion. The results of computation by the arithmetic circuit are inputted to one of the accumulators. Information about the state of the results of computation is stored in a status register. The accumulators are plurally provided and selectively used in accordance with the instruction. The calculation unit connects the parallel multiplier to the addition/subtraction logic arithmetic circuit by a known pipeline, and stores the results of multiplication by the parallel multiplier and the results of computation by the arithmetic circuit in the short-term storage register and one of the accumulators, respectively. The computation of the product and sum of, for example, $A = A + B \times C$ can be executed for each operation clock of the DSP.

The input selectors provided at the input portion of the addition/subtraction logic arithmetic circuit can be changed over in various ways based on the instruction of the software. They are suitable for the modem signal processing which includes a number of computations represented by the above equation. Further, the calculation unit has a feature in that the scrambling peculiar to a high-speed MODEM and the bit operation processing such as differential coding become easy because the form of the floating-point representation is supported therein. Namely, the floating-point arithmetic makes it easy to perform the bit shift operation, and facilitates the formation of instruction words for executing such bit operation processing.

The control unit comprises a program counter, a stack, an instruction storage memory, an instruction register, an instruction decoder, a repeat counter, a status control register, a status representation register, etc. They are suitably connected to the D-bus. The program counter is adapted to produce addresses for designating an instruction in the instruction storage memory (instruction ROM), and normally serves to update the values of the addresses one by one each time the instruction is executed. However, when a jump instruction is executed, a jump address that is being instructed is inputted to the program counter from the instruction register, thereby updating the contents of the address. Even where a subroutine reference instruction is executed, a reference address that is being instructed is brought up to data in the same manner as described above. At this case, the previous address is temporarily stored in the stack until the subroutine processing is completed. In addition, the reference to the subroutine can also be carried out by a plurality of stacks while the subroutine is in progress. When the subroutine processing has been finished, the routine processing is restarted by reading out the latest previous address from the stack. The processing utilizing such a stack may be an interrupt processing or handling. This interrupt handling is such that the flow of the processing that is being executed at present is forcedly interrupted to thereby execute the interrupt handling which has been prepared in advance. In order to execute this interrupt, the stack is used in the same manner as in the case of the subroutine, and the value of the previous address is temporarily stored therein for the processing restart. Since the interrupt is executed in the form of a circuit, the interrupt timing cannot be triggered accurately so far as the processing sequence to be interrupted is concerned. Therefore, there is the possibility of destroying data that is being processed, a status flag or the like. Information about the state of the processor when interrupted is required to be stored on the interrupt handling side as needed. This interrupt handling makes use of an internal timing signal TXS which will be described later.

Incidentally, where the numeric values designated by the instruction are directly stored in the above accumulators or other registers, a part of the instruction words temporarily stored in the instruction register is transferred through the D-bus. The instruction decoder interprets the instruction words and produces a control signal to control the overall operation of the DSP inclusive of the control unit. The repeat counter serves as a register for controlling the repeated operation of the instruction, and controls the number of its repetitions set therein in accordance with its control instruction. In addition, the repeat counter serves to circuitally control the repeated execution of the designated number of the same instructions or a sequence of processing instructions. The instruction processing can repeatedly be carried out without interruption of the arithmetic processing by the present function, thereby making it possible to enhance the efficiency in the execution of the instruction. The status control register is adapted to control the macro operation and may allow or disallow all interruptions by the instruction. The status representation register is a register adapted to reflect the inputted status of interruptions, the operated status of an external interface, the status of computation, etc. This register can perform a data read/write operation in accordance with an instruction. The functions of control units in such registers referred to above are basically known as a microcomputer's technique.

One chip type MODEM including the above-described DSP can make use of a circuit identical to or analogous to a VLSI for a MODEM, which has previously been developed by the applicants of the present application or the like and has been described in Japanese Patent Application No. 62-18414, except for such circuits as will be described later.

Figure 1:
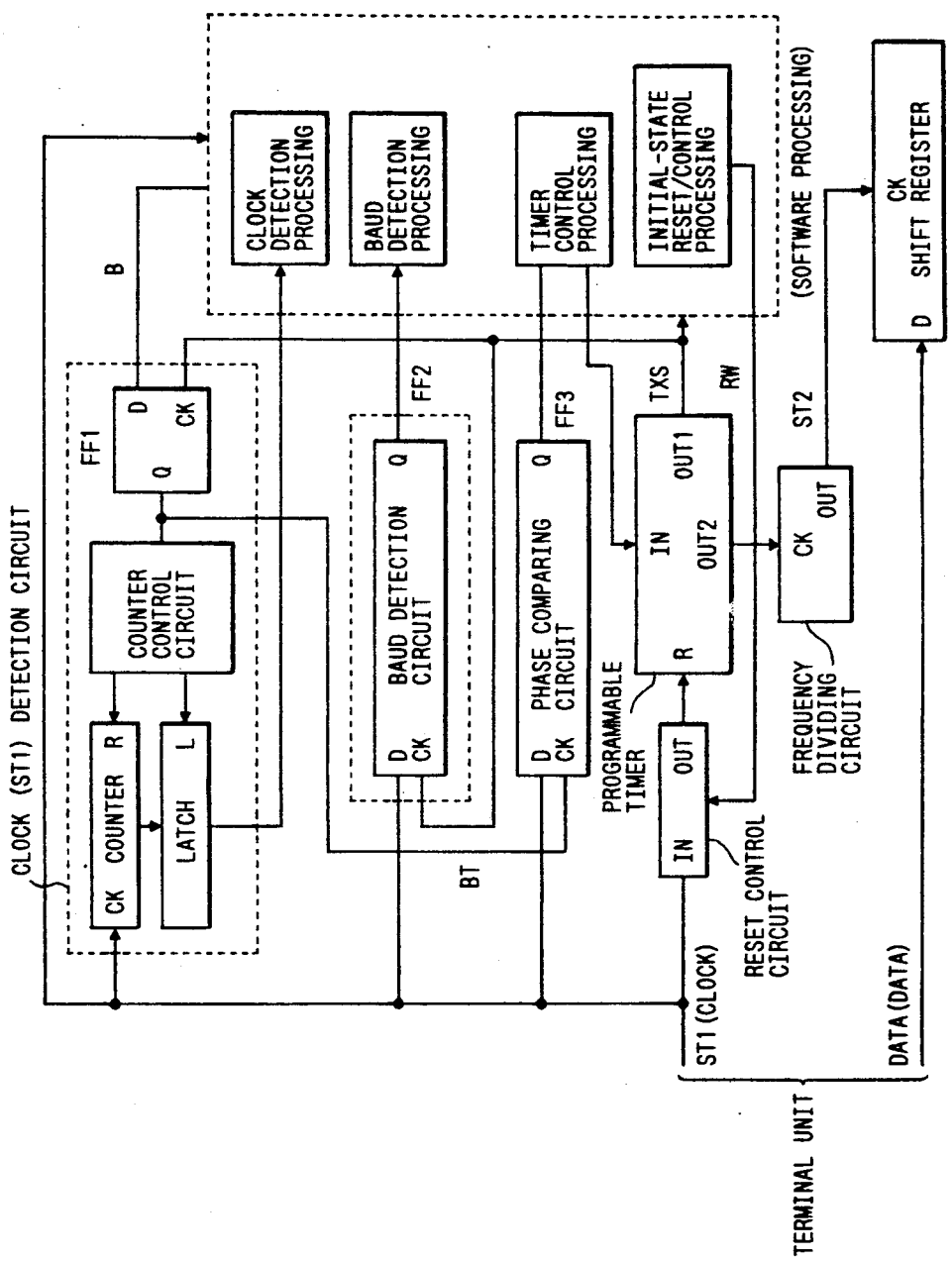
FIG. 1 is a block diagram showing one embodiment of a synchronizing circuit provided in each of a MODEM dedicated circuit and a digital phase-locked loop both of which constitute a MODEM.

FIG. 1 shows a block diagram of one embodiment illustrative of a synchronizing circuit included in the above-described MLOG and DPLL. Although not limited in particular, the functions of parts of the circuit are effected by software processing making use of the microprocessor included in the DSP to provide multi-functions and generalization in this embodiment. The areas of such functions effected by the software processing are surrounded by the broken line.

External clock ST1 supplied from the unillustrated terminal device is applied to an input terminal D of a flip-flop circuit FF3 which is activated as a phase comparing circuit in the DPLL. Supplied to a clock terminal CK of the flip-flop circuit FF3 is a signal BT produced by a flip-flop circuit FF1 to be described later, the signal BT functioning as an internal baud timing and being synchronized with an internal clock pulse TXS. Then, the flip-flop circuit FF3 outputs the result of comparison in phase between the ST1, in which the edge of the internal clock BT is taken as reference, and the BT, as a binary signal having two values "0" and "1". The result of output from the flip-flop circuit FF3 is subjected to timer control processing. Thus, when the above compared result, i.e., "0" or "1" is outputted by a predetermined number continuously, it is discriminated that a phase shift corresponding to the result has occurred. As a consequence, a value counted by a programmable timer is incremented or decremented by +1 or −1. The reason is that when the counted value of the programmable timer is immediately incremented or decremented by +1 or −1 according to the phase comparison result, the sensitivity of a PLL becomes extremely high, so that the PLL responds even to noise, thereby reducing the stability of its operation and causing an increase in the jitter of the internal clock. The operation for detecting the continuous formation of the above comparison result, i.e., "0" or "1" performs a role equivalent to the integral control action of a low-pass filter in the PLL.

The above programmable timer is provided with a fixed oscillator circuit having the same frequency as a fixed oscillator circuit for producing a clock used for the terminal device. This programmable timer performs the frequency-division of an oscillating signal from the first-mentioned fixed oscillator circuit to output the internal clock TXS from an output terminal OUT1 and to output, from an output terminal OUT2, a clock to be delivered to a frequency dividing circuit for producing a internal clock ST2 having the same frequency as the external clock ST1. When normally in operation, the above-described phase comparison result is subjected to the software processing. If it is judged that the phase between the external clock ST1 and the internal clock BT has been shifted, the value counted by the programmable timer is incremented or decremented by +1 or −1 correspondingly, thereby correcting the phase between the external clock ST1 and the internal clock ST2 to maintain the state of synchronization therebetween.

Incidentally, in the present embodiment, the external clock ST1 and the internal clock TXS are matched in phase with each other at a timing period of 1 baud in order to permit synchronization even in the case where the external clock ST1 and the internal clock TXS are different in phase from each other. Therefore, a baud signal B indicative of, for example, "0", is produced for each baud formed, by the software processing, and is then supplied to an input terminal D of the flip-flop circuit FF1. In addition, the internal clock TXS is supplied to a clock terminal CK of the flip-flop circuit FF1, thereby forming the baud timing signal BT synchronized with the internal clock TXS accurately, which is in turn supplied to the flip-flop circuit FF3 as the phase comparing circuit.

The above external clock ST1 is applied to an input terminal CK of a counter which constitutes a clock detection circuit. In order to detect in a short time whether or not the external clock ST1 is supplied thereto, the baud timing signal BT produced by the flip-flop circuit FF1 is used in the present embodiment. More specifically, when the internal clock TXS and the external clock ST1 are different in phase from each other, in other words, even when they are in a non-synchronized state, there is a constant relation therebetween in view of the frequency alone. Namely, the number of clocks per baud is equal to each other. Paying attention to this, the baud timing signal BT from the flip-flop circuit FF1 is supplied to a counter control circuit. The counter control circuit serves to produce a signal R for resetting the counter in accordance with the timing period of 1 baud. As a consequence, the counter counts the number of external clocks ST1 for the timing period of 1 baud. Then, the counter control circuit produces a latch signal immediately before resetting the above counter, and causes a latch, i.e., a latch circuit to hold the values counted by the counter. Thus, the latch circuit holds therein the counted values of the external clocks ST1 per baud. The number of external clocks has been determined by the transfer speed of the MODEM or the like. It is therefore feasible to detect whether or not the external clock ST1 is supplied, by the clock detection processing of the type that the counted values held in the latch circuit are checked by the software processing. As a consequence, the detection or determination as to whether or not the external clock ST1 is supplied can be made with 1 baud for counting the external clock ST1 and in an extremely short time corresponding to the software processing time. This permits a considerable reduction in the initialization time for the MODEM, together with high-speed synchronization of the DPLL to be described later.

In the present embodiment, the above external clock ST1 is supplied to a reset terminal R of the programmable timer through a reset control circuit in order to permit the high-speed synchronization of the DPLL at the time of its initial state. The reset control circuit serves as a gate circuit and supplies the external clock ST1 to the reset terminal R of the programmable timer in response to a control signal RW produced by initial-state reset/control processing only when in the initial state. Thus, the programmable timer is reset in synchronism with the external clock ST1 which has passed through the reset control circuit, so that the synchronization of the DPLL is instantly made possible.

However, the internal baud timing signal, which has been produced by counting the internal timing signal TXS, is rendered invalid by the forced reset operation of the programmable timer which makes use of the external clock ST1 substantially in asynchronism with the internal baud timing signal. Therefore, a baud detection circuit is provided in the present embodiment.

The baud detection circuit is made up of a flip-flop circuit FF2. The internal clock TXS is supplied to a clock terminal CK of the flip-flop circuit FF2 and the external clock ST1 is applied to an input terminal D thereof. Then, an output signal Q from the baud detection circuit is subjected to baud detection processing by software, thereby detecting a bit pattern.

Incidentally, although not limited in particular, the programmable timer outputs a frequency-divided signal from the output terminal OUT2 and supplies the same to the externally-provided frequency dividing circuit from which the internal clock ST2 set to have the same frequency as the external clock ST1 is produced. The internal clock ST2 is used as a clock for introducing data supplied from the terminal device in synchronism with the external clock ST1. Namely, the data serially supplied from the terminal device is serially introduced into a shift register for setting the internal clock ST2 to a shift clock. Then, the data thus introduced is delivered, as parallel data comprising a plurality of bits per baud, to the DSP, where it is modulated in the baud unit.

Incidentally, the internal clock TXS is used as an interrupt signal in the above-described software processing. The predetermined processing is executed for each occasion.

Figure 2:
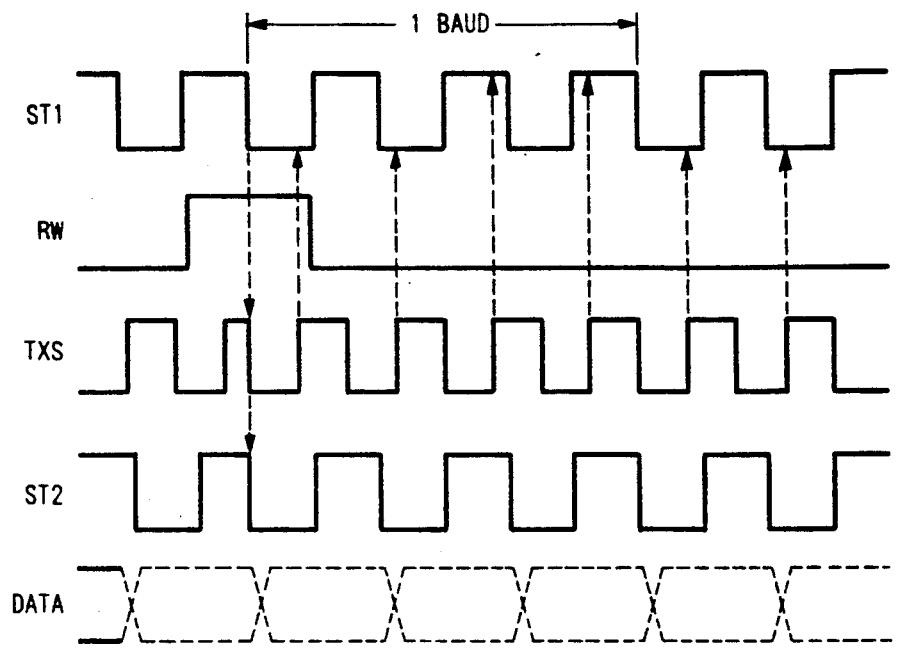
FIG. 2 is a timing chart for describing one example of operation of the synchronizing circuit.

FIG. 2 shows a timing chart for describing one embodiment of the synchronizing operation and the baud detecting operation of the DPLL. In the MODEM employed in the present embodiment, 1 baud is made up of 3 bits. In other words, the external clock ST1 consists of 3 clocks per baud, whereas the internal clock TXS is composed of 4 clocks per baud.

When the control signal RW is rendered high in level by the initial-state reset/control processing, a gate of the reset control circuit is enabled so that the external clock ST1 is supplied to the reset terminal R of the programmable timer. As a consequence, the programmable timer is reset in synchronism with the trailing edge of the external clock ST1, for example. The internal clock TXS and the ST2 formed by the programmable timer are also rendered low in level according to the reset operation. Thus, the synchronization of the DPLL is momentarily performed.

The control signal RW is rendered high in level by the initial-state reset/control processing so far as an interval corresponding to about 1 cycle of the external clock ST1 is concerned. Therefore, the above reset operation is performed only one time when the programmable timer is in an initial state. Thus, the programmable timer is no longer reset by the external clock ST1 in undesired timing after the synchronization of the DPLL has already been performed. After the synchronization of the DPLL has been made based on the reset operation of the programmable timer at the time of its initial state, the synchronization between the clock ST1 and the TXS and between the clock ST1 and the ST2 is maintained by a fine-adjustment/phase control operation based on the result or output of comparison of the phase comparing circuit (FF3).

After the synchronization of the DPLL has been made according to the reset operation at the time of the initial state, the baud detection circuit performs its detecting operation in the baud timing. More specifically, the flip-flop circuit FF2 is activated in unison with the rise timing of the internal clock TXS to take in or introduce the level of the external clock ST1 therein. Namely, the external clock ST1 in which 1 baud is made up of 3 clocks and the internal clock TXS in which 1 baud consists of 4 clocks become a bit pattern of "0011", as indicated by the dotted line arrows in the same drawing, while the synchronized state is maintained as described above, where "0" represents a low level whereas "1" shows a high level. It is therefore found that the timing indicative of a break-point of 1 baud represents the transition, i.e., the instance of change in the output of the flip-flop circuit FF2 from "1" to "0". Namely, when the initial output of the following baud is brought into "0" after the final output of the previous baud is brought into "1", it is found that the internal clock TXS of the flip-flop circuit FF2 is a top clock of the baud. Therefore, a timing signal B or the like produced each baud period can be produced by hereafter performing the counting operation in which the top clock is regarded as reference.

Incidentally, data DATA is supplied to the shift register in synchronism with the external clock ST1 as indicated by the dotted line in the same drawing. Therefore, when the DPLL is activated in synchronism with the external clock ST1, the data DATA thus supplied can be introduced into the shift register for each baud, taking the internal clock ST2 formed by the DPLL as a clock. Namely, the data introduced into the shift register is delivered in parallel to the DSP in accordance with the baud timing, where the modulation based on the PSK system is performed in a signal unit of 3 bits/baud.

Figure 3:
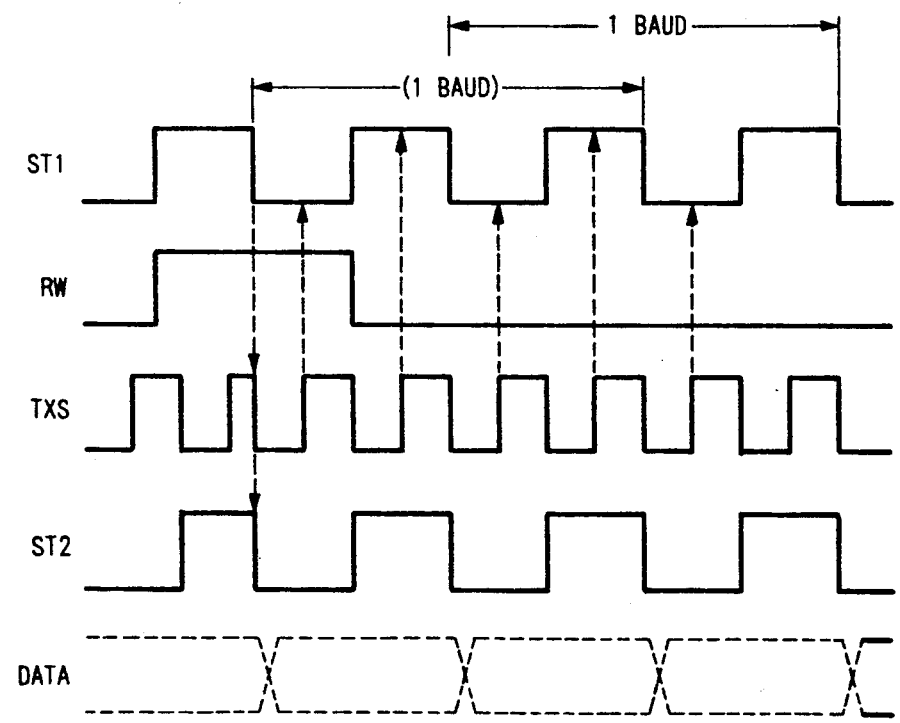
FIG. 3 is a timing chart for describing another example of operation of the synchronizing circuit.

FIG. 3 shows a timing chart for describing another example illustrative of both of the synchronizing operation and baud detection operation of the DPLL. In the MODEM employed in this example, 1 baud consists of 2 bits. In other words, the external clock ST1 is made up of 2 clocks per baud, whereas the internal clock TXS is composed of 4 clocks per baud.

When the control signal RW is rendered high in level by the initial-state reset/control processing, a gate of the reset control circuit is enabled so that the external clock ST1 is supplied to the reset terminal R of the programmable timer. As a consequence, the programmable timer is reset in synchronism with the trailing edge of the external clock ST1, for example. The internal clock TXS and the ST2 formed based on the external clock ST1 are also rendered low in level according to the reset operation. Thus, the synchronization of the DPLL is momentarily performed in the same manner as described above. After the synchronization of the DPLL has been made based on the reset operation of the programmable timer at the time of its initial state, the synchronization between the clock ST1 and the TXS and between the clock ST1 and the ST2 is maintained by the fine-adjustment/phase control operation based on the result or output of comparison of the phase comparing circuit (FF3).

After the synchronization of the DPLL has been made according to the reset operation at the time of the initial state, the baud detection circuit performs its detecting operation in the baud timing. More specifically, the flip-flop circuit FF2 is activated in unison with the rise timing of the internal clock TXS to take in or introduce the level of the external clock ST1 therein. Namely, the external clock ST1 having 1 baud made up of 2 clocks and the internal clock TXS having 1 baud comprised of 4 clocks become a bit pattern of "0101" as indicated by the arrow of the dotted line in the same drawing while the synchronized state is maintained as described above. When the internal clock TXS has the frequency twice that of the external clock ST1 in this way, the pattern of "0101" is formed. As described above, when the output of the following baud is detected as "0" after detection of the pattern of "0101", it is found that the internal clock TXS corresponding to this output "0" is the top clock of the baud. Therefore, the timing signal B or the like produced each baud period can be formed by hereafter performing the counting operation in which the top clock is regarded as reference.

When the output of the flip-flop circuit FF2 is changed from "1" to "0" separately from that, the timing signal B or the like produced for each baud period may be formed by defining the internal clock TXS as the top clock of the baud and hereafter by performing the counting operation in which the internal clock TXS is regarded as reference. At this case, it is only necessary to detect the event that the output of the flip-flop circuit FF2 has been changed from "1" to "0". Therefore, the baud detection processing becomes easier and the baud detection can be performed in a shorter time.

Incidentally, the data DATA is supplied to the shift register in synchronism with the external clock ST1 as indicated by the dotted line in the same drawing. Therefore, when the DPLL is activated in synchronism with the external clock ST1, the data DATA thus supplied can be introduced into the shift register for each baud, taking the internal clock ST2 formed based on the external clock ST1 as a clock. Namely, the data introduced into the shift register is delivered in parallel to the DSP in accordance with the baud timing, where the modulation based on the PSK system is performed in the form of a signal unit of 2 bits/baud.

Although not shown in the drawing, 1 baud is made up of 4 bits. In other words, in the MODEM of the type that the external clock ST1 is composed of 4 clocks per baud and the internal clock TXS is made up of 4 clocks per baud, the above baud detection processing can be omitted. More specifically, when the external clock ST1 has the same frequency as the internal clock TXS as reference of the baud timing in this way, it is only necessary to reset the programmable timer at the time of its initial state in unison with the falling edge of the external clock ST1. After completion of such synchronization, a suitable clock out of the internal clocks TXS formed by the programmable timer is employed as a criterion, and the baud timing can be defined by counting the clock.

Figure 4:
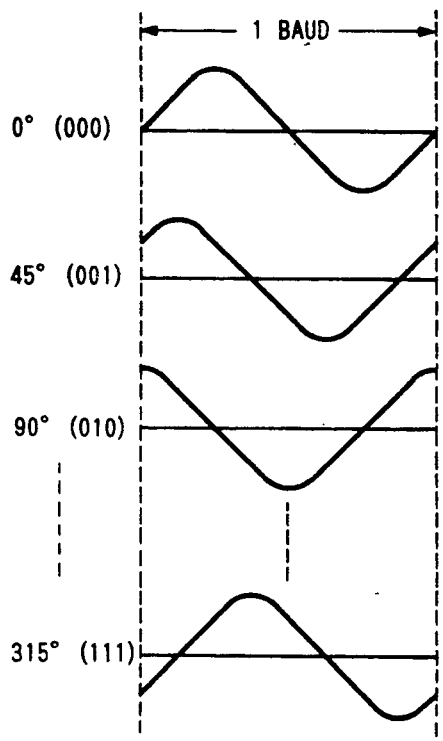
FIG. 4 is a waveform for illustrating one example of a PSK modulation system.

FIG. 4 shows one example of signals modulated by the PSK system of the 3 bits/baud type.

When 3 bits are assigned for each baud as described above, "000" is fixed in correspondence to a sine wave having the phase "0". The phase of each sine wave is caused to lead $45°(\pi/4)$ by $45°(\pi/4)$ in association with a change in a one-bit-by-one-bit as in the case of "001" and "010". Namely, as shown by way of a typical illustrative example in the same drawing, the phase of the sine wave corresponding to "001" is advanced by $45°(\pi/4)$ in front of that of the sine wave corresponding to "000". In addition, the phase of the sine wave corresponding to "010" is advanced by $90°(\pi/2)$ in front of that of the sine wave corresponding to "000". Furthermore, the sine wave corresponding to "111" is brought forward in phase by 315°(3π/4) with respect to that of the sine wave corresponding to "000". As described above, in the PSK system, the phase modulation is performed so as to produce eight kinds of sine waves whose phases are different π/4 by π/4 from one another in correspondence to eight bit patterns formed among "000"–"111". In this way, it is necessary to process data in a baud unit at the inside of the MODEM. Therefore, the detecting operation in the baud timing is essential to the MODEM as described above.

Incidentally, although not shown in the drawing, when 1 baud is 2 bits, it is only necessary to form four kinds of sine waves which are different in phase from one another π/2 by π/2. On the other hand, when 1 baud is 4 bits, a QAM system can be used. Namely, sixteen kinds of modulating signals corresponding to 4-bit data can be produced or formed by subjecting two kinds of amplitude modulation to eight kinds of the phase modulation described above based on the most significant bit.

Figure 5:
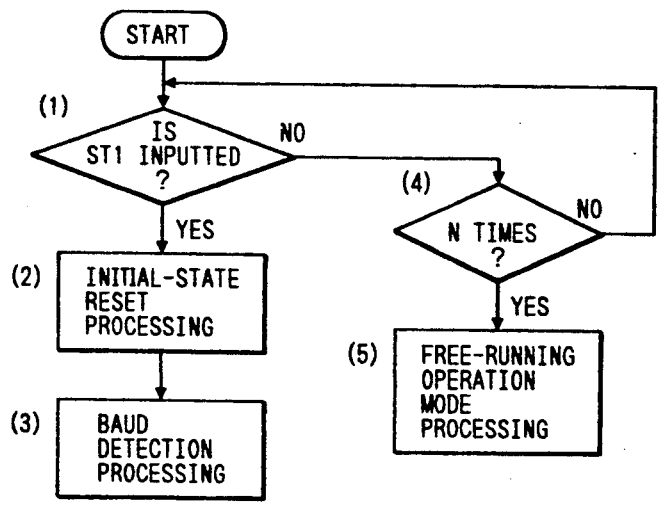
FIG. 5 is a schematic flow chart for describing one embodiment of a software for the phase synchronizing processing at the time of an initial state.

FIG. 5 shows a schematic flow chart for describing one embodiment of software for the phase synchronizing processing at the time of the initial state.

It is determined in Step (1) whether or not the external clock ST1 is inputted. In the present embodiment, in order to assuredly detect whether or not the external clock ST1 is inputted, the routine procedure proceeds to free-running operation mode processing in Step (5) when it is determined that a predetermined number of counted values (three in the embodiment shown in FIG. 2 and two in the embodiment depicted in FIG. 3) are absent for 1 baud period, i.e., the predetermined number of counted values are absent over N times in Step (4).

When it is judged that the external clock ST1 is present in Step (1), the initial-state reset processing is performed. Namely, as described above, the control signal RW is produced and the reset operation of the programmable timer in the DPLL is effected in synchronism with the edge of the external clock ST1.

After completion of the initial-state reset operation in Step (2), the baud detection processing is executed in Step (3).

When the initial-phase synchronizing processing is completed in the above-described manner in this way, the routine procedure advances to the normal synchronizing processing. Namely, the DPLL is activated to detect a phase shift from the level of the external clock ST1 sampled in the baud timing BT by means of the flip-flop circuit FF3 as the phase comparing circuit. Then, the data about the phase shift thus detected is caused to pass through a random walk filter which performs the timer control processing, to thereby obtain the output result therefrom. Thereafter, the result is fed back to the programmable timer through input IN. Thus, the synchronizing operation of the DPLL is carried out.

Figure 6:
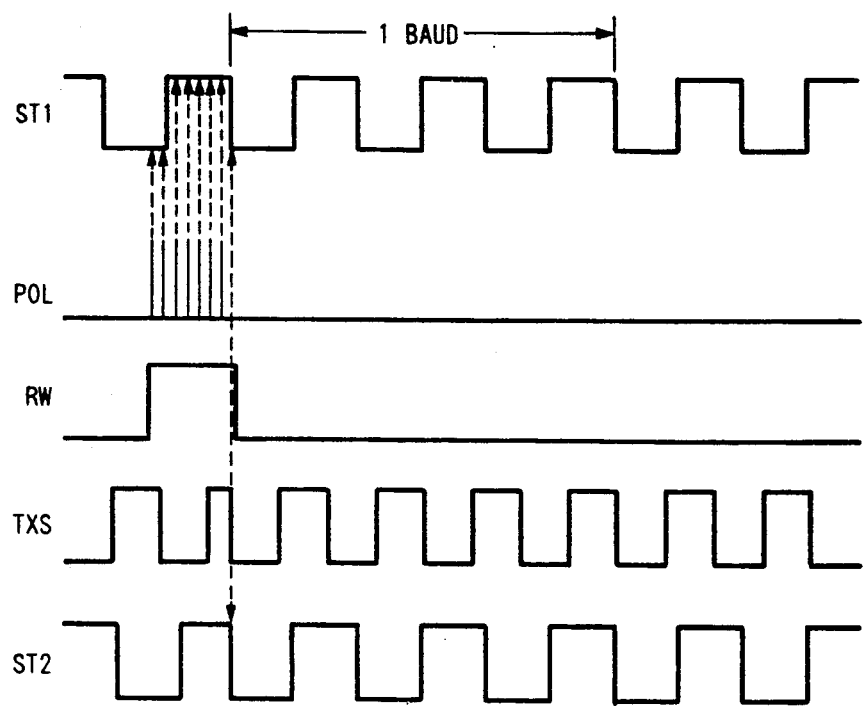
FIG. 6 is a timing chart for describing one embodiment of a baud detection method.

FIG. 6 shows a timing chart for describing one embodiment of a baud timing detection method.

In this embodiment, referring to FIG. 1, when the external clock ST1 is subjected to polling in accordance with a timing signal POL and the fall of the external clock ST1 is detected, in other words, when the level of the external clock ST1 is changed from the high level "1" to the low level "0" by the above polling, from the point at the time the programmable timer is released from a reset mask by the control signal RW, in other words, from the time when the reset control circuit has started the supply of the external clock ST1 to the reset terminal R of the programmable timer, it is judged that the reset operation of the programmable timer has been performed. Then, the control signal RW is rendered low in level and the programmable timer is subjected to a reset mask again. For the purpose of this polling, the external clock ST1 is also supplied to the unit for the software processing, which is indicated by the broken line in FIG. 1.

According to this method, the baud timing is shown when the fall of the external clock ST1 is detected. It is thus unnecessary to detect the baud timing again after its detection. As a consequence, this method permits the baud detection in a shorter time as compared with the baud detection method using the output signal from the flip-flop circuit FF2. Namely, it is possible to perform the baud detection in a short time without wasting 1 baud period or two baud periods as described above. In addition, the flip-flop circuit FF2 as the baud detection circuit becomes unnecessary.

However, since the level of the external clock ST1 is determined by the polling, the above-described baud detection method can be applied to the case where there is ample time to cause the software processing to perform the polling as in the case where the software processing for activating the MODEM adopts a half-duplex system which performs only a signal transmission without using the full-duplex system which performs the signal transmission/reception simultaneously. Therefore, such baud detection circuit shown in FIG. 1 is also provided in hardware. When there is a time to spare for the software processing, the baud detection processing based on the polling is performed. On the other hand, when there is no time to spare for the software processing, the baud detection processing making use of the output from the flip-flop circuit FF2 is effected. In other words, both baud detection processings may be used properly according to the processing capacity, operation modes and functions for each occasion.

Operation and effects obtained from the above embodiments are as follows:

(1) In the DPLL circuit which is synchronized in accordance with the external clock supplied externally, the programmable timer in the DPLL circuit is reset in synchronism with the edge of the external clock at the time of its initial state. In addition, the baud timing of the external clock is detected by using the internal clock produced or formed by the DPLL circuit. As a consequence, the synchronization of the DPLL can be performed momentarily, and its internal operation can be returned to the normal condition by detecting the baud timing.

(2) According to the item (1), the time of from a request-to-transmit to the MODEM from the terminal device to a clear-to-send can sharply be reduced at any case.

(3) It is possible to make a determination or detection as to whether or not the external clock is inputted, in a short time by counting the number of the external clocks with the baud timing signal formed inside.

(4) According to the above baud-timing detection method, the detection of the baud timing can be performed at high speed without an increase in hardware by detecting the change in the level of the external clock at the time that the above programmable timer is reset, by the polling.

(5) To the DPLL circuit of the type that its synchronization is performed in accordance with the external clock supplied from the outside, gate means for selectively introducing or taking in the external clock and the flip-flop circuit for making a judgment as to the level of the external clock by the internal clock produced from the DPLL circuit are added so as to be a simple arrangement. The gate means is controlled to reset the programmable timer of the DPLL circuit by the external clock at the time of its initial state. In addition, the synchronization of the DPLL can be performed instantly and its internal operation can be set to the normal condition by detecting the baud timing from the bit pattern representative of the output signal from the flip-flop circuit.

A specific description has been made above of the invention which has been made by the present inventors. However, the present invention is not necessarily limited to the above-described embodiments. It is needless to say that many changes and modifications can be made without departing from the gist of the invention as set forth herein. For example, the principal circuit blocks of the MODEM shown in FIG. 1 may be divided suitably as well as the formation of the circuit blocks in a single semiconductor chip. The units processed in software may be replaced by those processed in hardware. As the programmable timer, a device may be used that performs such operation as referred to above, regardless of the name of a programmable counter, a variable frequency dividing circuit or the like.

As specific structures of the respective circuits, various forms can be adopted such as those formed of CMOS circuits, those used with Bi-CMOS circuits formed by a combination of bipolar-type transistors and CMOS circuits for high-speed purposes.

The present invention can be employed widely in a synchronizing system for an information processing apparatus in which data is serially inputted in synchronism with a clock provided that data comprising a plurality of bits is treated as a unit and employed in its circuit, as well as in the MODEM.

What is claimed is:

1. A synchronizing circuit comprising:
   a programmable timer for receiving an external clock signal and forming an internal clock signal;
   means for comparing respective phases of said external clock signal and a baud timing signal formed using said internal clock signal for each baud timing;
   means for controlling said programmable timer in accordance with a result of a phase comparison of said comparing means;
   reset control means for synchronizing a transitional edge of said internal clock signal with a corresponding transitional edge of said external clock signal by resetting said internal clock signal formed in the programmable timer when said external clock signal is initially received in the programmable timer;
   baud detection means for forming a bit pattern in accordance with said external clock signal and said internal clock signal; and,
   means for forming the baud timing signal supplied to said comparing means in accordance with said bit pattern.

2. The synchronizing circuit of claim 1 wherein the comparing means comprises a flip flop.

3. The synchronizing circuit of claim 1 wherein the baud detection circuit comprises a flip flop.

4. The synchronizing circuit of claim 1 wherein the forming means comprises a flip flop.

5. The synchronizing circuit of claim 1 wherein the reset control means includes means for receiving a control signal.

6. The synchronizing circuit of claim 1 further comprising means for detecting baud timing during polling of the external clock signal.

7. A synchronizing circuit useful for synchronizing internal clock signals of a modulator/demodulator circuit (MODEM) with external clock signals of an external device, the synchronizing circuit comprising:
   means for detecting a number of clocks per baud in an external clock signal of the external device being input to the synchronizing circuit;
   means for producing a control signal in accordance with the number of clocks per baud detected;
   means for resetting an internal clock signal of the synchronizing circuit in synchronism with the external clock signal in accordance with the control signal;
   means for producing a bit pattern in accordance with the internal and external clock signals; and,
   means for maintaining the synchronism between the internal clock signal and the external clock signal established by the resetting means in accordance with the bit pattern.

8. A modulator/demodulator circuit (MODEM) useful for interaction with external devices, the modem comprising:
   a digital signal processor comprising a microprocessor means for processing software; and,
   a synchronizing means for synchronizing the modem with the external device in accordance with the software, the synchronizing means comprising:
      a programmable timer for receiving an external clock signal and forming an internal clock signal;
      means for comparing respective phases of said external clock signal and a baud timing signal formed using said internal clock signal for each baud timing;
      means for controlling said programmable timer in accordance with a result of a phase comparison of said comparing means;
      reset control means for synchronizing a transitional edge of said internal clock signal with a corresponding transitional edge of said external clock signal by resetting said internal clock signal formed in the programmable timer when said external clock signal is initially received in the programmable timer;
      baud detection means for forming a bit pattern in accordance with said external clock signal and said internal clock signal; and,
      means for forming the baud signal supplied to said comparing means in accordance with said bit pattern.

9. A method for synchronizing respective clock signals of a modulator/demodulator (MODEM) and an external device, the modem comprising a clock detection circuit, an initial-state reset control processing means, reset control means, a programmable timer, and baud detection circuit, the method comprising steps of:
   detecting, by the clock detection circuit, a number of clocks per baud in an external clock signal of the external device being input to the modem;

producing a control signal by the initial state reset control processing means in accordance with the detecting;

resetting an internal clock signal of the programmable timer in synchronism with the external clock signal in accordance with the control signal;

producing a bit pattern by the baud detection circuit in accordance with the internal and external clock signals; and, maintaining the synchronism between the internal clock signal and the external clock signal established by the resetting in accordance with the bit pattern.

10. A modulator/demodulator circuit (MODEM) useful for interaction with an external device, the modem comprising:

means for receiving first digital data from a digital data line;

means for receiving first analog data from an analog data line;

means for converting the first analog data to second digital data;

digital signal processing means for modulating the first digital data and demodulating the second digital data, the digital signal processing means further including means for processing synchronizing software;

means for converting the first digital data to second analog data;

means for outputting the second analog data to the analog data line;

means for outputting the second digital data to the digital data line; and means for synchronizing the modem with the external device in accordance with the synchronizing software processed by the digital signal processing means, the synchronizing means comprising:

a programmable timer for receiving an external clock signal from the external device and forming an internal clock signal;

means for comparing respective phases of said external clock signal and a baud timing signal formed using said internal clock signal for each baud timing;

means for controlling said programmable timer in accordance with a result of a phase comparison of said comparing means;

reset control means for synchronizing a transitional edge of said internal clock signal with a corresponding transitional edge of said external clock signal by resetting said internal clock signal formed in said programmable timer when said external clock signal is initially received in said programmable timer;

baud detection means for forming a bit pattern in accordance with said external clock signal and said internal clock signal; and, means for forming the baud signal supplied to said comparing means in accordance with said bit pattern.

* * * * *